Reissued Feb. 29, 1944

Re. 22,448

UNITED STATES PATENT OFFICE 22,448

ORGANIC PHOSPHORUS COMPOUND BEARING LUBRICANT

Bert H. Lincoln, Ponca City, Okla., and Gordon D. Byrkit, Niagara Falls, N. Y., assignors to Continental Oil Company, Ponca City, Okla., a corporation of Delaware No Drawing. Original No. 2,302,703, dated November 24, 1942, Serial No. 323,959, March 14, 1940. Application for reissue November 23, 1943, Serial No. 511,486

15 Claims. (Cl. 252—51)

This invention relates to improvements in lubricants. More specifically, this invention relates to improved materials which, when added to lubricants, greatly increase their resistance to oxidation and formation of corrosive products during use and often improves other characteristics as well. This application is a continuation-in-part of our copending application, Serial No. 231,362, filed September 23, 1938.

Present-day mechanical devices require lubricating oils of high film strength, of high oiliness characteristics, and of low tendency to oxidize during use. It has been found that the present-day hydrocarbon lubricants of the very highest quality are deficient in these very important characteristics. These three properties are of vital importance under conditions of thin film lubrication where the lubricant has been squeezed from between the friction surfaces because of high pressure, slow speeds, and other causes. It is readily seen that the viscosity or the body of the lubricant plays no part in this type of lubrication and that the remaining film of oil must have a very high film strength and be of high oiliness value to prevent rupture of the film of the lubricant, which would cause seizure. The oil film must tend to keep the coefficient of friction as low as possible. The oil must resist oxidation when these thin films are heated in the presence of oxygen as they are in use.

Mechanical devices are being designed for higher pressure operation and the film strength of the best quality straight hydrocarbon lubricant has been found to be too low. It will be obvious that an invention which provides a means of improving the film strength of these lubricants is of great importance to the art of lubricant manufacture and to the designer and fabricator of mechanical devices.

Substantially all machines operate in part or at times totally under conditions of boundary or thin film lubrication, under which conditions the oiliness of unctuosity of the lubricant is the first and primary requisite of efficient operation. Those skilled in the art of lubricant manufacture or machine manufacture will readily appreciate the value of an invention that will improve the oiliness of these otherwise high quality lubricants. Furthermore sludge and acid are especially deleterious under conditions of thin film lubrication. The sludge is not a lubricant in any sense of the word, and the soluble acid is particularly corrosive to bearing metals such as cadmium-silver, copper-lead, and the like.

In starting idle mechanical equipment which is lubricated from a sump by pumping or circulating the lubricant there is always a short period of time in which the rubbing surfaces must operate under conditions of dry friction if ordinary hydrocarbon lubricants are used. With dry friction, the wear on friction surfaces is extreme; and during cold weather when the lubricant is sluggish or during periods when the lubricating system is not functioning properly for one reason or another, rubbing surfaces may not only suffer considerable wear but may be damaged to the point where they must be replaced. The product of our invention has a very important property of reacting with the metal surfaces, penetrating or adsorbing on the metal surfaces, and leaving a film of lubricant with high oiliness character, which remains on the metal surface irrespective of the length of time the machine has been idle.

This high oiliness film gives very even and smooth operation, which may be easily discerned by the experienced operator or lubricating engineer.

When the hydrocarbon lubricants are diluted with unburned fuel or with other light hydrocarbons, the small degree of oiliness of the original hydrocarbon lubricant is greatly decreased. We have found that the addition of the products of our invention to hydrocarbon lubricants more than compensates for the loss in oiliness and load-carrying ability from dilution.

It is well known that, in order to obtain lubricants which are preeminently satisfactory from the standpoint of oxidation in use it is necessary to refine the oil thoroughly and then to add an inhibitor of oxidation. The thorough refining may consist of more and heavier acid treatments or solvent treating so as to remove a considerable part of the oil and leave only the most stable portion. Such drastic refining is necessary in order to obtain stability with respect to sludge formation, but the oil is then subject to easy oxidation to form soluble acids and other corrosive materials. This can be prevented by the addition to the refined oil of small amounts of materials which either prevent the formation of these corrosive products or by some action render them inert. Furthermore, such well refined oils are susceptible to the formation during use of lacquerlike materials which tend to stick rings. This results in blow-by and hence loss of power, failure of lubrication, scratching, scoring, overheating, and eventually replacement of parts. It is practically impossible to refine a lubricant in such a manner as to avoid all three of these difficulties, namely, sludge soluble corrosive products, and lacquer. It is considerably more advantageous to add the materials of our invention and avoid these difficulties by this method.

Many of these additive materials are effective when added to poorly refined or even wholly unrefined lubricants. The addends may thus be substituted in whole or in part for the usual refining processes.

In the prior art of applying these principles to the manufacture of lubricants, many diverse types of materials have been suggested to be added to obtain improvement in various characteristics. It has been found that the addition of various organic esters of the oxygen and sulfur acids of phosphorus frequently improves film strength, oxidation resistance, non-corrosiveness, and other characteristics. Nitrogen compounds have been found to inhibit oxidation of oils. Our materials combine both of these properties.

One object of our invention is to provide improved inhibitors of oxidation and corrosion for addition to lubricants.

Another object of our invention is to provide film strength improving addition agents suitable for use in lubricants and especially in crankcase lubricants.

Other and further objects of our invention will appear in the course of the following description.

In general, our invention consists of the addition of certain organic phosphorus compounds containing at least one phosphorus-nitrogen double-bond to hydrocarbon fuels and lubricants. These materials combine the advantages of the phosphorus compounds and of the nitrogen compounds, particularly in preventing the development of corrosive materials during use. Compounds having a double bond between a phosphorus and a nitrogen atom have outstanding anti-oxidant properties. Why this is so is not clear, but the fact remains that it is so. We believe that the anti-oxidant activity is a result of the augmented chemical reactivity at the point of the double bond, which is instrumental in reducing to an unusual degree the oxidation rate and oxidation tendencies of the fuels and lubricants with which these compounds are blended. With a double bond between the nitrogen and phosphorus atoms, there is a likelihood that these may react with primary valence bonds in an oxidation reaction, thus showing more chemical activity than when all of the valences of the nitrogen and phosphorus atoms are satisfied by primary valence bonds. Obviously we do not wish to be bound by these theories but only by the appended claims interpreted as broadly as the prior art permits.

Besides the unexpected and unusual oxidation inhibiting effects produced by this class of compounds, there is increased film strength and increased oiliness. Some of these materials which are suitable for use in accordance with our invention are shown in the following outline. All and each of these are to be considered as examples of our invention when blended in an oil of lubricating viscosity.

A. Phosphazo halides, R—N:PX (R is an aromatic radical; X is a halogen)
   1. Phosphazobenzene chloride, $C_6H_5N{:}PCl$
   2. Phosphazoxylene chloride, $(CH_3)_2C_6H_3N{:}PCl$
   3. Phosphazochlorobenzene chloride, $ClC_6H_4N{:}PCl$
   4. Phosphazophenylbenzene chloride, $C_6H_5C_6H_4N{:}PCl$
   5. Phosphazonitrobenzene bromide, $O_2NC_6H_4N{:}PBr$ B. Arxyloxy-phosphazo-aromatics RN:POR′ (R and R′ are aromatic radicals)
   1. Phenoxy-phosphazobenzene, $C_6H_5N{:}POC_6H_5$
   2. p-Amyloxyphenoxy - phosphazobenzene, $C_6H_5N{:}POC_6H_4OC_5H_{11}$
   3. p-Amylphenoxy - phosphazobenzene, $C_6H_5N{:}POC_6H_4C_5H_{11}$
   4. p-Amylphenoxy - phosphazotoluene, $CH_3C_6H_4N{:}POC_6H_4C_5H_{11}$ C. Anilides of phosphazo-aromatics RN:P.NHR′ (R and R′ are aromatic radicals)
   1. Phosphazobenzene anilide, $C_6H_5N{:}P.NHC_6H_5$
   2. Phosphazotoluene mesidide, $CH_3C_6H_4N{:}P.NHC_6H_2(CH_3)_3$
   3. Phosphazochlorobenzene chloranilide, $ClC_6H_4N{:}P.NHC_6H_4Cl$ D. Oxyphosphazo-aryl anilides, RNH.PO:NR′ (R and R′ are aromatic radicals)
   1. Oxyphosphazobenzanilide, $C_6H_5NH.PO{:}NC_6H_5$
   2. Oxyphosphazobensophenylanilide, $C_6H_5NH.PO{:}NC_6H_4C_6H_5$
   3. Oxyphosphazochlorobenzotoluidide, $CH_3C_6HNH.PO{:}NC_6H_4Cl$
   4. Oxyphosphazobenzochloroanilide, $ClC_6H_4NH.PO{:}NC_6H_5$ E. Trichlorophosphanils, $RN{:}PCl_3$ (R is an aromatic radical)
   1. Trichlorophosphanil, $C_6H_5N{:}PCl_3$
   2. Trichlorophosphochloranil, $ClC_6H_4N{\equiv}PCl_3$ F. Sulfophosphazoaryl chlorides, RN:PSCl (R is an aromatic radical)
   1. Sulfophosphazobenzene chloride, $C_6H_5N{:}PSCl$
   2. Sulfophosphazomethylbenzoate chloride $CH_3O.CO.C_6H_4N{:}PSCl$
   3. Sulfophosphazochloronaphthalene chloride, $ClC_{10}H_6N{:}PSCl$ G. Triaryl phosphazines, $R_2C{:}N.N{:}PR'_3$ (R is aliphatic; R′ is aromatic or aliphatic)
   1. Tribenzyl phosphazine, $CH_2{:}N.N{:}P(CH_2C_6H_5)_3$
   2. Tri-o-chlorobenzyl dimethylphosphazine $(CH_3)_2C{:}N.N{:}P(CH_2C_6H_4Cl)_3$
   3. Tricyclohexyl phosphazine, $CH_2{:}N.N{:}P(C_6H_{11})_3$ H. Aryl phosphin-imines, $R_3P{=}NR'$ (R′ is aromatic, R's may be aromatic or aliphatic)
   1. Phenyl diethyl phenylphosphin-imine, $(C_6H_5)(C_2H_5)_2P{:}NC_6H_5$
   2. Triamyl phenylphosphin-imine, $(C_5H_{11})_3P{:}NC_6H_5$
   3. Tribenzyl o - chlorophenylphosphin-imine $(C_6H_5CH_2)_3P{:}NC_6H_4Cl$ Any of these compounds or other members of the classes represented or their derivatives within the limitations set forth above may be used within the scope of our invention.

It is to be understood that in practicing our invention, oil-soluble phosphorus-nitrogen compounds of the type described are to be selected. Some of the examples described have only limited solubility in hydrocarbon oils. It is to be remembered, however, that, because of their great efficiency, extremely small amounts are often effective. Thus we may use as little as 0.001 per cent of some of these compounds, and it will be seen that a fairly insoluble material may dissolve to a sufficient extent to be satisfactory for our purpose. In general, more than 0.001 per cent of our addition agents are used, and we may add one, two, or even five per cent or more.

Furthermore, it is well known that different types of oils have different capabilities of dissolving a given material. For some purposes therefore, we prefer paraffinic lubricants, while for other purposes we prefer naphthenic or mixed base lubricants. Another method of obtaining a satisfactory mixture of addition agent with the hydrocarbon oil is the use of a mutual solvent to bring the addend into solution. Alternatively, peptizing agents may be added to maintain the organo-phosphorus compound in permanent suspension.

Many of the more difficultly soluble materials are rendered more soluble by the introduction of alkyl groups, particularly those containing four or more carbon atoms. The isoamyl, octyl, lauryl, and octadecyl radicals and radicals from paraffin wax greatly increase the solubility of organic compounds in oil. One or more of such groups may be introduced as required into the previously described compounds or their derivatives. For example, phosphazobenzanilide is not very soluble in hydrocarbon lubricating oils but phosphazooctadecyl - benzenexylidide is much more soluble.

The selection of a particular compound or compounds to be used as an addition agent to the hydrocarbon oil is to be made considering the use to which the blend is put. Thus, if water is likely to be present during use, a phosphorus compound or combination of compounds is selected which is not affected by water. In general, we prefer to use compounds having boiling points over 250° F. It is sometimes advantageous to combine more than one of these compounds in a blend to obtain particular properties. We accomplish this by mixing two or more of these compounds together and blending the mixture with the hydrocarbon oil or by blending one in the hydrocarbon oil, blending the second into this mixture, and so on until the composition is complete.

The various phosphorus-nitrogen compounds usually improve both the film strength and oxidation characteristics of the hydrocarbon oil. For example, the sludging tendencies may be decreased by as little as 0.001 per cent of our phosphorus-nitrogen compounds. The oxidation characteristics of lubricants are very important, and these are markedly improved by our compounds. The ability to reduce friction is another feature contributed to lubricants by our phosphorus-nitrogen compounds.

It may be desirable to include in one and the same blend based on a hydrocarbon oil, in addition to the addends here described, other addends for specific purposes. Thus, we may add a pour point depressor such as a naphthalene-chlor wax condensation product and a viscosity index improver such as certain resins or polymerized hydrocarbons in addition to our organo-phosphorus compounds. Furthermore, various metallic compounds may be added to the blend without interfering with the action of our ingredients. Indeed, in some cases it is advantageous to combine with our organic phosphorus-nitrogen compounds in a hydrocarbon oil blend such materials as calcium dichlorostearate, chromium oleate, tin octadecyl phthalate, aluminum stearate, and other metallic soaps.

Our addends are admirably adapted for use in lubricating oils of all types including those designed for use in automotive crankcases, Diesel oils, and any other oils of lubricating viscosity as castor oil, cottonseed oil, lard oil, sperm oil, shale oil. Furthermore, our addends are advantageously blended in gasoline and other petroleum fuels either directly or after being blended first in a lubricating oil and then added to the fuel. Soap-thickened mineral oils of all types ranging from those showing only a slight increase in viscosity over that of the mineral oil alone to the semisolid and solid greases containing fifty per cent or more of soap are amenable to treatment according to our invention. In making these greases, the usual soaps such as sodium stearate, aluminum stearate, calcium soaps of beta fat and the like may be used. Various other thickening ingredients or materials for other purposes may be added. These include yarn, hair graphite, glycerol, water, lamp black, mica, zinc dust, litharge, and the like.

The following examples of blends of our addition agents are given as illustrations but not as limitations:

*Example 1*

| | Per cent |
|---|---|
| Mid-Continent paraffin-base SAE 30 | 99.0 |
| p-Amylphenoxyphosphazobenzene | 1.0 |

*Example 2*

| | Per cent |
|---|---|
| California naphthenic base SAE 30 | 99.5 |
| Phosphazo-p-tert.-butylbenzene anilide | 0.5 |

*Example 3*

| | Per cent |
|---|---|
| Mid-Continent mixed base SAE 50 | 98.4 |
| Aluminum naphthenate | 1.3 |
| Tribenzyl phosphazine | 0.3 |

*Example 4*

| | Per cent |
|---|---|
| Mid-Continent paraffin base SAE 40 | 93.8 |
| Voltolized corn oil | 5.0 |
| Chlorodiphenylene oxide | 1.0 |
| Triamyl phenylphosphin-imine | 0.2 |

*Example 5*

In making a grease containing our addends we may use:

| | Per cent |
|---|---|
| Oleic acid | 8.1 |
| Lime | 1.2 |
| Water | 0.3 |
| Dichlorostearic acid | 1.1 |
| Bright stock | 13.1 |
| Distillate (440 seconds at 100° F.) | 76.0 |
| Phosphazobenzene chloride | 0.2 |

*Example 6*

In making a lubricating gasoline, we blend 0.5 per cent of the product of Example 1 with gasoline. The product has the composition:

| | Per cent |
|---|---|
| Gasoline | 99.5 |
| Oil | 0.495 |
| p-Amylphenoxyphosphazobenzene | 0.005 |

It is to be understood, however, that the hydrocarbon oil in the treated fuels may be of a viscosity of from about 35 seconds at 100° F. S. S. U. to 350 seconds or more; and the amount of oil blended with the phosphorus-nitrogen compound to form the fuel addend may vary between 0 per cent and 99.5 per cent. In some cases, the fuel may be prepared without adding any hydrocarbon oil. The quantity of phosphorous-nitrogen compound in the final blended fuel may vary from 0.0001 to 1.0 per cent or slightly more.

It will be understood that certain features and subcombinations may be employed without reference to other species or combinations. This is contemplated by and is within the scope of our claims. It is further obvious that various changes may be made in details within the scope of our claims without departing from the spirit of our invention. It is therefore to be understood that our invention is not to be limited to the details described.

Having thus described our invention, we claim:

1. A lubricant comprising in combination a major proportion of oil of lubricating viscosity and a minor proportion of an organic phosphorus compound containing at least one nitrogen-phosphorus double bond.

2. A lubricant comprising in combination a major proportion of oil of lubricating viscosity and a minor proportion of an organic compound containing phosphorus and nitrogen connected by a double bond.

3. A lubricant comprising in combination oil of lubricating viscosity and from 0.001 to 5 per cent of an organic phosphorus compound containing at least one nitrogen-phosphorus double bond.

4. A lubricant comprising in combination a major proportion of oil of lubricating viscosity and a minor proportion of a phosphazine.

5. A lubricant comprising in combination a major proportion of oil of lubricating viscosity and a minor proportion of a phosphazo-aromatic anilide.

6. A lubricant comprising in combination a major proportion of oil of lubricating viscosity and a minor proportion of an aryloxyphosphazo-aromatic.

7. A lubricant comprising in combination a major proportion of oil of lubricating viscosity and a minor proportion of p-amylphenoxy-phosphazotoluene.

8. A lubricant comprising in combination a major proportion of oil of lubricating viscosity and a minor proportion of phosphazobenzene anilide.

9. A lubricant comprising in combination a major proportion of oil of lubricating viscosity and a minor proportion of tribenzyl phosphazine.

10. A lubricant comprising in combination a major proportion of oil of lubricating viscosity and a minor proportion of an oil-soluble halogen-containing organic phosphorus compound containing at least one nitrogen-phosphorus double bond.

11. A lubricant comprising in combination oil of lubricating viscosity and from 0.001 to 5 per cent of an oil-soluble organic phosphorus compound containing at least one nitrogen-phosphorus double bond having at least one atom of halogen in the organic phosphorus compound.

12. A lubricant comprising in combination a major proportion of oil of lubricating viscosity and a minor proportion of an oil-soluble chlorine-containing organic phosphorus compound containing at least one nitrogen-phosphorus double bond.

13. A lubricant comprising in combination oil of lubricating viscosity and from 0.001 to 5 per cent of an oil-soluble phosphorus compound containing at least one nitrogen-phosphorus double bond having at least one atom of chlorine in the organic phosphorus compound.

14. A lubricant comprising in combination a major proportion of oil of lubricating viscosity and a minor proportion of an oil-soluble aromatic halogen-containing phosphorus-nitrogen compound in which the phosphorus and nitrogen are connected by a double bond.

15. A lubricant comprising in combination a major proportion of oil of lubricating viscosity and a minor proportion of ain oil-soluble aromatic chlorine-containing phosphorus-nitrogen compound in which the phosphorus and nitrogen are connected by a double bond.

BERT H. LINCOLN.
GORDON D. BYRKIT.